United States Patent [19]

Henderson et al.

[11] 4,359,436

[45] Nov. 16, 1982

[54] METHODS OF AND SYSTEMS FOR CONTROLLING THE EXPANSION OF CELLULAR PLASTIC INSULATION IN THE MANUFACTURE OF INSULATED CONDUCTORS

[75] Inventors: Joseph G. Henderson, Bel Air; Alan S. Markham, Baltimore; Richard D. Neumyer, Reisterstown, all of Md.

[73] Assignee: Western Electric Company, Inc., New York, N.Y.

[21] Appl. No.: 258,844

[22] Filed: Apr. 29, 1981

[51] Int. Cl.³ .................... B29D 27/00; B29F 3/10
[52] U.S. Cl. .................... 264/40.6; 264/45.9; 264/174; 425/113; 425/143; 425/817 C
[58] Field of Search .............. 264/40.6, 40.7, 40.2, 264/45.9, 174; 425/143, 817 C, 113

[56] References Cited

U.S. PATENT DOCUMENTS

| | | |
|---|---|---|
| 2,765,441 | 10/1956 | Gambrill . |
| 2,908,861 | 10/1959 | Gambrill . |
| 3,748,577 | 7/1973 | Jones, Jr. .................... 324/61 R |
| 3,877,653 | 4/1975 | Foltyn et al. .................... 242/25 A |
| 3,914,357 | 10/1975 | Cereijo et al. .................... 264/40.2 |
| 4,017,228 | 4/1977 | Cereijo et al. .................... 425/71 |
| 4,177,097 | 12/1979 | Hudson, Jr. et al. .................... 156/48 |

Primary Examiner—Philip E. Anderson
Attorney, Agent, or Firm—J. B. Hoofnagle

[57] ABSTRACT

A conductive element (22) is preheated by a preheat power supply (34) to an initial temperature which is a function of line speed. The preheated conductive element (22) is advanced through an extruder (32) whereat a cellular insulation layer (24) and a solid plastic insulation layer (26) are extruded thereabout to form an insulated conductor (20). The insulated conductor (20) is advanced through an air gap (38) whereat the cellular insulation layer 24 expands about the conductive element (22). The insulated conductor (20) is then quenched at a point to stop the expansion of the cellular insulation layer by passing the insulated conductor into a cooling bath (40).

A capacitance monitor (50) measures the coaxial capacitance of the insulated conductor (20) and develops an error signal. Thereafter, a microcomputer (54) facilitates the adjustment of the temperature of conductive element (22) as a function of line speed and the error signal and the adjustment of the point of quenching as a function of the error signal. The adjustment of the temperature and the point of quenching facilitates control of the expansion of the cellular insulation layer (24).

18 Claims, 12 Drawing Figures

METHODS OF AND SYSTEMS FOR CONTROLLING THE EXPANSION OF CELLULAR PLASTIC INSULATION IN THE MANUFACTURE OF INSULATED CONDUCTORS

TECHNICAL FIELD

This invention relates to methods of and systems for controlling the expansion of cellular plastic insulation in the manufacture of insulated conductors and particularly to methods of and systems for stabilizing and precisely controlling the coaxial capacitance of insulated conductors during the manufacture thereof to facilitate control of the expansion of cellular plastic insulation formed about the insulated conductors.

BACKGROUND OF THE INVENTION

In the telephone communications industry, air core cable is being replaced by filled cable in particular applications. Each cable core includes a plurality of conductive elements having insulation thereon to form insulated conductors. In filled cable, the interstices of the core are filled with a water-proofing compound to prevent ingress of water into the core which affects the electrical characteristics of the cable. The resplacement of the air in the interstices with water-proofing compound results in inferior dielectric properties. In order to compensate for this, the amount of insulation on the conductive element of each insulated conductor within the core must be increased. This method of construction results in an increase in the cross-sectional area of the insulated conductors as well as that of the core. Moreover, additional sheathing material such as jacketing compound is required to properly cover the core.

In order to realize the advantages of filled cable, the size of the core must be reduced. This may be accomplished by using dual insulation as a primary insulation for the individual conductors. Generally, in dual insulated conductors, a cellular plastic insulation is extruded over and in engagement with the conductive element. A solid abrasion-resistant plastic material is extruded about the cellular plastic insulation to form a skin layer. The reduction in the diameter of the insulated conductor leads to a core size for filled cable which approximates the size of the core in air core cable.

While it is desirable to use cellular plastic insulation, there are certain problems which must be overcome. The processing of an extrudable plastic material containing an expanding medium to form the cellular plastic insulation is a sensitive manufacturing process. The problem of maintaining a predetermined uniform coaxial capacitance between a point on the periphery of the cellular plastic insulation and the insulated conductor is complicated by random variations in the composite dielectric constant of the insulation. These variations may result from changes in the degree of expansion of the cellular plastic insulation which is affected by changes in temperature, pressures and other factors in the process of applying the insulation to the conductive element.

U.S. Pat. No. 3,914,357, which issued to M. R. Cereijo et al., discloses methods of monitoring the application of cellular plastic insulation to an elongated bare conductive element. The method includes advancing successive sections of the conductive element and extruding at least a layer of the cellular insulation material thereon to form an insulated conductor. The capacitance and the associated diameter of the successive section of the insulated conductor are measured. With respect to the weight of insulation per length of conductor and the percent voids in the cellular insulation material, a continuous indication of the measured capacitance and the associated diameter of the successive sections is generated. The percent expansion or the weight of the insulation material per length of the elongated material may be regulated in response to the generated indication to maintain the diameter and the associated capacitance substantially at preselected values.

In view of the foregoing, there is a need for a system which accurately and precisely controls coaxial capacitance of the insulated conductor by using the measured capacitance to control the temperature of the bare conductive element entering an extruder and the point of cooling or quenching the insulated conductor.

SUMMARY OF THE INVENTION

This invention contemplates methods of and systems for controlling the expansion of cellular plastic insulation in the manufacture of an insulated conductor having a conductive element and a layer of cellular insulation extruded thereabout. A bare conductive element is preheated to an initial temperature. The preheated conductive element is then advanced through an extruder whereat a layer of cellular insulation is extruded thereabout to form an insulated conductor. The insulated conductor is quenched to stop the expansion of the layer of cellular insulation whereafter the coaxial capacitance of the insulated conductor is measured. An error signal is generated which is the difference between the measured capacitance and a standard capacitance value. Thereafter, the temperature of the conductive element is adjusted as a function of line speed and the error signal and the point of quenching is adjusted as a function of the error signal. The adjustment of the temperature and the point of quenching facilitates control of the expansion of the layer of cellular insulation.

DETAILED DESCRIPTION

Figures 1, 2, 3:
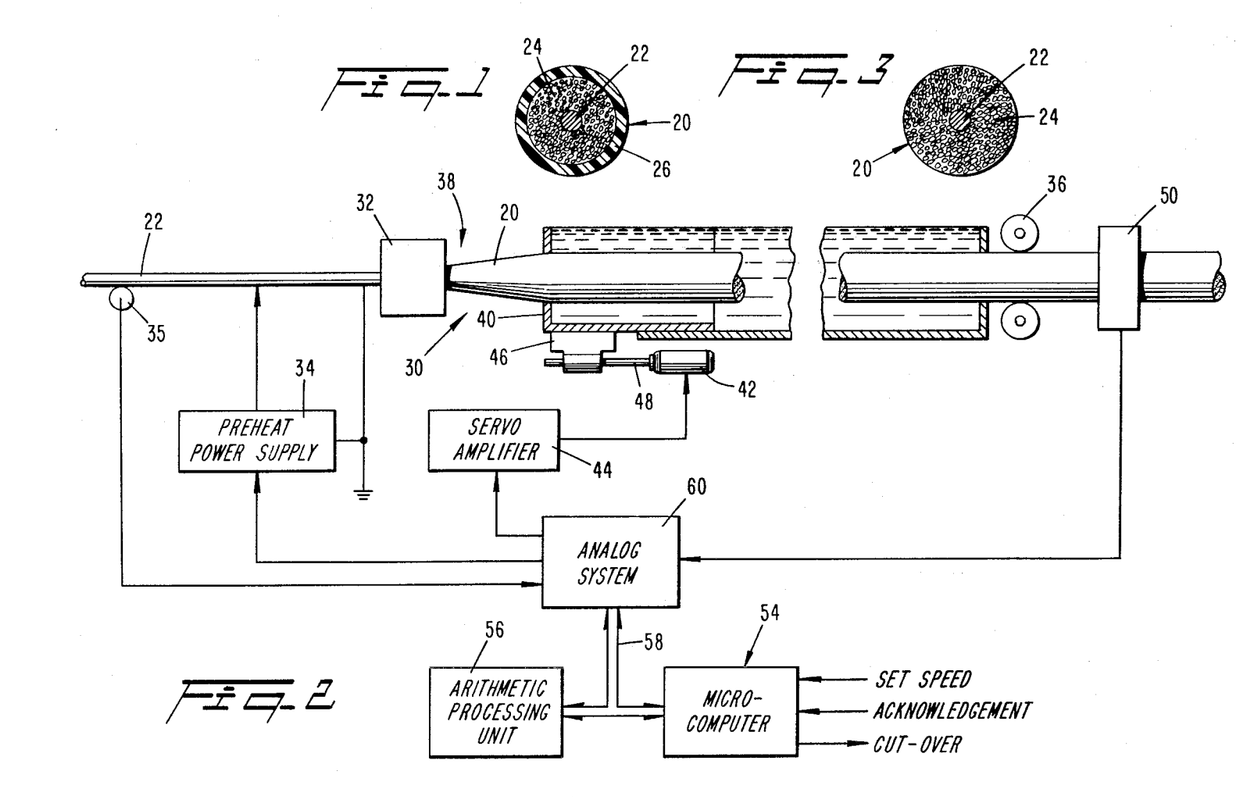
FIG. 1 is a sectional view of an insulated conductor having a conductive element insulated with an inner layer of cellular plastic insulation and an outer layer of solid plastic insulation extruded thereabout.
FIG. 2 is a diagram of a system for manufacturing the insulated conductor of FIG. 1 in accordance with certain principles of the invention.
FIG. 3 is a sectional view of an insulated conductor having a conductive element insulated with a layer of cellular plastic insulation extruded thereabout.

Referring to FIG. 1, there is illustrated a dual insulated conductor, designated generally by the numeral 20, which includes a conductive element 22 having an inner layer 24 and an outer layer 26 of plastic insulation thereabout. The inner layer 24 is formed preferably of cellular plastic insulation, for example polyethylene, containing a plurality of minute blown cells distributed uniformly throughout. The cellular plastic insulation is formed from a solid plastic material normally containing an admixed expanding medium. The outer layer 26, or skin as it is commonly designated, is preferably a solid plastic, such as polyvinyl chloride or polyethylene, which forms a protective jacket around the inner layer 24. The outer layer 26 imparts tough mechanical properties, possesses better voltage breakdown characteristics and provides a suitable material for color coding. Moreover, by having a solid plastic layer over the cellular layer, the permeability of the insulation of conductor 20 is reduced which substantially eliminates the possibility of seepage of a filling compound into the insulation during a core filling operation.

Referring to FIG. 2, there is illustrated a system, designated generally by the numeral 30, for insulating successive sections of the conductive element 22 with the inner layer 24 (FIG. 1) of cellular insulation enclosed with the skin layer 26 of solid plastic material. The conductive element 22 is moved through the system 30 at a controlled line speed (S) to facilitate the insulation application. A system similar to system 30 could be used to insulate the conductive element 22 with a single layer 24a (FIG. 3) of cellular insulation.

The system 30 controls the expansion of the cellular insulation layer 24. In one aspect of controlling expansion, the conductive element 22 must be heated to a consistent temperature prior to entering an extruder system 32 hereinafter referred as extruder 32 of the system 30 to facilitate proper expansion of the insulation layer 24. This is accomplished by a voltage which is placed across a fixed length of the conductive element 22. The voltage is a function of the line speed of the conductive element 22 and is generated by a preheat power supply 34. The line speed of the conductive element 22 is measured by an annealer tachometer 35. Successive sections of the conductive element 22 are advanced by a capstan 36 through a die (not shown) in the extruder 32 whereat the insulation layers 24 and 26 are applied. During the extrusion of insulation layers 24 and 26 onto successive sections of the moving conductive element 22, some of the expanding medium within layer 24 decomposes under heat to release gas which goes into solution. Thereafter, due to the heat of the die, the remaining expanding medium is decomposed creating nucleating sites by releasing gas and heat.

As the successive sections of the conductor 20 are advanced out of the extruder 34, the inner layer 24 of cellular plastic insulation immediately increases in size due to the expansion of gases formed as a result of the decomposition of the expanding medium. Minute distributed, discrete gas-filled cells are formed throughout the layer 24. The conductor 20 then travels through an air gap, designated generally by the numeral 38, and into a cooling trough 39. The cooling trough 39 contains cooling water to form a cooling bath 40 which facilitates cooling the skin layer 26 and inner layer 24. In another aspect of controlling expansion, this cooling or quenching action occurring in the bath 40 stops the expansion of the cellular plastic layer 24.

Thus, the air gap 38 is an important variable in determining the amount of expansion by the cellular plastic insulation layer 24 with the expansion of layer 24 being proportional to the length of the air gap 38. The cooling bath 40 is reciprocally movable longitudinally along the conductor 20. A servo motor 42, which is driven by a servo amplifier 44, is mounted near one end of the bath 40. A linear actuator 46, which is fixedly attached along one surface of the bath 40, is coupled to a motor shaft 48 extending from the motor 42. The linear actuator 46 converts rotational movement of the shaft 48 into linear movement of the bath 40 along the conductor 20. This linear movement of the bath 40 facilitates adjustment of the air gap 38 and the point of quenching the conductor 20 and, thereby, the amount of expansion of the cellular plastic insulation.

After expansion of layer 24 of conductor 20 has been quenched by the cooling bath 40, a capacitance monitor 50 continuously measures the coaxial capacitance of the insulation layers 24 and 26 covering the conductive element 22. The capacitance monitor 50 may be of the type shown in U.S. Pat. Nos. 2,765,441 and 2,908,861 which issued to R. D. Gambrill incorporated herein by reference thereto. The capacitance monitor 50 compares the measured coaxial capacitance with an internal standard capacitance value which represents a desired value of coaxial capacitance. Error signals are generated which represent deviations from the desired value of capacitance. The error signal facilitates the movement of the cooling bath 40. Thus, as the error signals get larger, the cooling bath 40 moves faster to bring the system 30 into control by quenching the insulation layers 24 and 26 and stopping the expansion process.

The system 30 also includes a microcomputer, designated generally by the numeral 54. The microcomputer 54 facilitates control of the temperature of the conductive element 22 and the expansion of insulation layer 24 according to the steps of a stored program. An arithmetic processing unit 56 is included to relieve the microcomputer 54 of the extensive arithmetic calculations which are required. The arithmetic processing unit 56 communicates with the microcomputer 54 through a bus system 58. An analog input/output system 60 is used to interconnect the preheat power supply 34, annealer tachometer 35, the servo amplifier 44, and the capacitance monitor 50. The analog system 60 serves as an analog-to-digital (A/D) converter for input signals from the annealer tachometer 35 and the capacitance monitor 50. The analog system 60 also serves as a digital-to-analog converter (DAC) for processing control signals which are fed to the preheat power supply 34 and the servo amplifier 44. The analog system 60 also communicates with the microcomputer 54 through the bus system 58.

The analog input/output system 60 is commercially available from Burr-Brown Research Corporation of Tucson, Arizona and is identified as a Microcomputer Analog I/O Board Model MP8418 PGA-AO. The microcomputer 54 is commercially available from Intel Corporation of Santa Clara, California and is identified as Model ISBC 569. The arithmetic processing unit 56 is available from Advanced Microcomputers of Santa Clara, California and is identified as a Model AMC-95/6011.

In operation, an operator (1) sets a speed potentiometer (not shown) to indicate a desired operating line speed and (2) initiates a system reset by activating the power for the system 30. The system 30 starts from a zero line speed and approaches the operating line speed in a linear manner. The system 30 also initiates a timer (not shown) having a counting interval which is of sufficient duration to insure that the system attains the operating line speed. After the counting interval of the timer has expired, the timer generates and feeds to the microcomputer 54 a set speed signal which indicates that system 30 has attained the operating line speed. During this initialization phase, the microcomputer 54, according to the stored program, configures inputs and outputs. The microcomputer 54 also sets initial conditions on the analog system 60, and the arithmetic processing unit 56. A universal programmable interface (UPI) (not shown), a programmable interrupt controller (PIC) (not shown) and timer (not shown), which are part of the microcomputer 54, are also reset. The universal programmable interface and the programmable interrupt controller are commercially available from Intel Corporation of Santa Clara, California and are identified as Model 941 and Model 8259, respectively. A detailed description of the interface and the controller is included in the Digital Controller ISBC 569 Intelligent Board Hardware Reference Manual available from Intel Corporation as manual number 9800845-01 and is incorporated herein by reference thereto.

When power is applied to system 30, the conductive element 22 begins to move through the system and approaches a predetermined minimum line speed. During this period, no preheat voltage is applied to the bare conductive element 22 entering the extruder 32. Also, the conductor 20 is being wound onto a first take-up reel (not shown) of a two-reel take-up system similar to the system disclosed in U.S. Pat. No. 3,877,653 which issued to Z. S. Foltyn and D. G. Stetka which is incorporated herein by reference thereto. The microcomputer 54 delays further execution of the stored program for a predetermined time. Thereafter, the microcomputer 54 determines when the tachometer 35 indicates a line speed (S) which exceeds the predetermined minimum speed. At this time, the microcomputer 54 facilitates (1) the movement of the cooling bath 40 rapidly toward the extruder 32 to locate the bath at a starting point relative to the extruder and (2) the generation of a preheat control voltage (VP) for the preheat power supply 34 to apply an initial heating voltage on the conductive element 22 immediately prior to entering the extruder 32.

The preheat control voltage (VP), which is a function of line speed (S), is determined basically by the equation:

$$VP = K S^x \tag{1}$$

where "K" and "x" are constants having different values for different systems and "S" represents the line speed of the conductive element 22. However, after the set speed signal has been received by the microcomputer 54, the preheat control voltage, and the heating voltage for the conductive element 22, becomes a function of the line speed (S) and the capacitance monitor error signal (E). At this time, the microcomputer 54 facilitates the generation of the preheat control voltage (VP$_s$) based on the equation:

$$VP_s = K S^2 + V1 + G \tag{2}$$

where $$G = (E/|E|)(G1)(1 - e^{(-E3)(|E|)}), \tag{3}$$

V1 = a cumulative displacement value which is defined as the average value of G over G2 program cycles, G1 = an empirical constant which is a function of the mechanical configuration of the system 30.

G2 = an empirical constant which is a function of the mechanical configuration of the system 30, and E3 = an empirical constant which is a function of the mechanical configuration of the system 30.

The microcomputer 54 also facilitates the generation of a control voltage (VQ) for controlling the quench-point associated with the cooling bath 40 as a function of the capacitance monitor error signal (E). The generated quench-point control voltage (VQ) is based on the equation:

$$VQ = (G/|G|)(Q1)(G^{Q2}) \tag{4}$$

where

G = equation (3) above,

Q1 = an empirical constant which is a function of the mechanical configuration of the system 30, Q2 = an empirical constant which is a function of the mechanical configuration of the system 30, and G1 = an empirical constant as defined above.

When the set speed signal is received, the microcomputer 54 initiates an in-specification timer (not shown). The microcomputer 54 now establishes control of the preheat control voltage (VP$_s$) and the quench-point control voltage (VQ) according to equations (2) and (4), respectively, noted above. When the in-specification timer attains a preset count, the microcomputer 54 determines whether the characteristics of the insulated conductor 20 are within specifications. If the specifications are not met, the microcomputer 54 reinitiates the in-specification timer and continues to control voltages (VP$_s$) and (VQ) for another period equal to the preset counter. If, and when, the specifications are met, the microcomputer 54 generates a cut-over signal which is fed to the take-up system. The cut-over signal facilitates the transfer of the insulated conductor 20 from the first reel to an empty or second take-up reel (not shown). This operation reduces the amount of insulated conductor 20 which is scrapped. This transfer is confirmed by an acknowledgement signal received from the take-up system. Thereafter, the system 30 is in a steady-state condition and the microcomputer 54 continues to control voltages (VP$_s$) and (VQ) in accordance with equations (2) and (4) noted above.

Referring to FIGS. 4 through 12, the flow charts illustrated therein reveal the steps of the program, which is stored in the microcomputer 54, for controlling the expansion of insulation layer 24. Since insulation layer 26 has been extruded over insulation layer 24, layer 26 will necessarily expand under pressure developed by expanding layer 24. Initially, the operator starts the program by pressing a power button (not shown). Step 100 initializes the position of a stack pointer. Step 101 sets a reset latch which enables the universal programmable interface. Step 102 establishes which ports of the UPI will be used as input ports and which ports will be used as output ports. Step 103 initializes the PIC and sets an interrupt mask. Step 104 facilitates the establishment of a gain level for each of input channels 1 and 2 of the analog system 60. Step 105 facilitates the initialization of all random access memory (RAM) variables. Step 106 initializes the preheat control voltage (VP) and the quench point control voltage (VQ) to a value of zero. Step 107 sets an interrupt mask. Step 108 enables all of the interrupts. Step 109 calls a subroutine which determines the line speed (S) and places a value which represents the line speed on top of stack (TOS) and in a designated memory location.

Figures 4, 5:
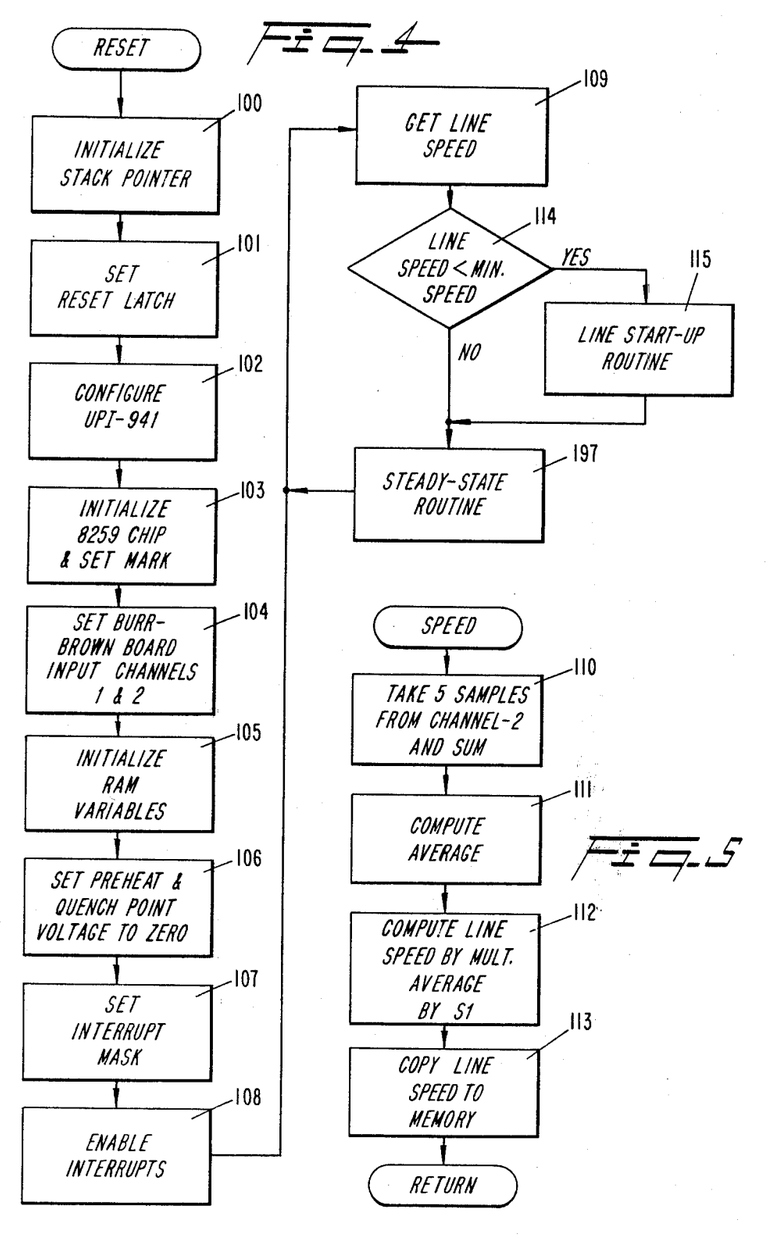
FIGS. 4 through 12 show various flow diagrams which illustrate a programmed procedure of control and operation of the system of FIG. 2 in accordance with certain principles of the invention.

Referring to FIG. 5, the flow chart illustrated therein reveals the steps of a SPEED subroutine which determines the value of line speed (S) which is used in the various determinations made during the operation of system 30. Step 110 facilitates the fetching of five samples of line speed from channel 2 of the analog system 60, which is coupled to the annealer tachometer 35, and sums the samples together. Step 111 computes an average value of the line speed (S). Step 112 converts the average value of line speed (S) into feet per minute by multiplying the average value by a constant S1 and places the result on the TOS. Step 113 stores the average feet-per-minute value of the line speed (S) in the memory location which average value is hereinafter referred to as line speed (S).

Referring again to FIG. 4, step 114 detetermines whether the line speed (S) is less than the predetermined minimum speed. Step 115 calls a subroutine which controls the system 30 during the initialization process if the line speed (S) is less than the predetermined minimum speed.

Figure 6:
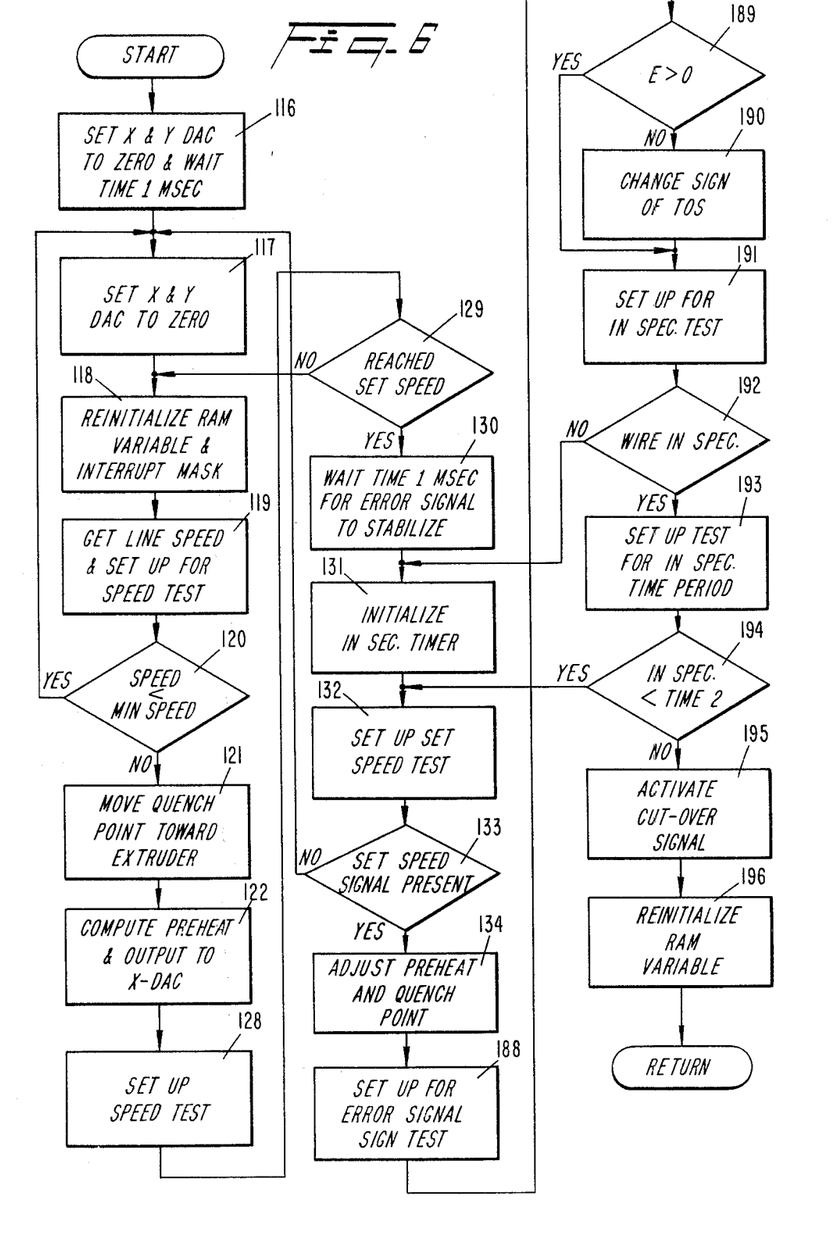

Referring to FIG. 6, the flow chart illustrated therein reveals the steps of a START subroutine which controls the generation of the preheat and quench point control voltages prior to process stabilization. The START subroutine relinquishes its control when the capacitance monitor error signal (E) is less than five millivolts for a predetermined time period. Step 116 facilitates (1) the setting of the preheat and quench point control voltages (VP) and (VQ), respectively, to zero and (2) a delay of execution of the program for another time period. Step 117 also facilitates the setting of the preheat and quench point control voltages (VP) and (VQ), respectively, to zero. Step 118 facilitates the reinitialization of the RAM variables and resets the interrupt mask. Step 119 calls the SPEED subroutine which facilitates the measurement of the line speed (S). Step 120 compares the line speed (S) with the predetermined minimum speed and facilitates the repeating of steps 117 through 120 if the line speed is less than the predetermined minimum speed. However, if the line speed (S) is greater than minimum speed and the set speed signal is not present, step 121 facilitates the rapid movement of the cooling bath 40 in the direction of the extruder 32. Step 122 (1) calls a subroutine which calculates the preheat control voltage (VP) and (2) facilitates application of the control voltage to the preheat power supply 34.

Figure 7:
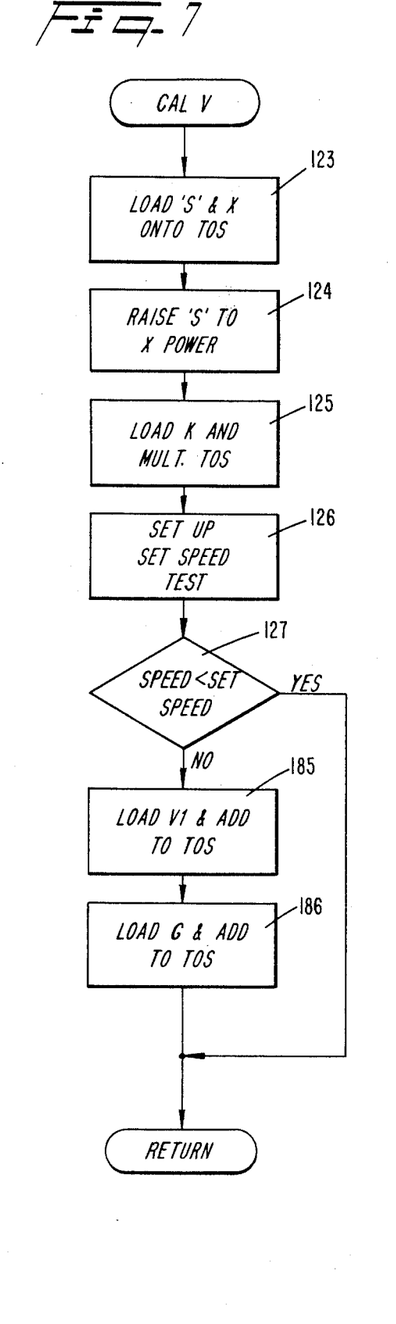

Referring to FIG. 7, the flow chart illustrated therein reveals the steps of a CALV subroutine which calculates the preheat control voltage (VP). When the line speed (S) is greater than the predetermined minimum speed and the set signal is not present, the preheat control voltage (VP) is a function of only the line speed (S). Steps 123 through 125 facilitate the calculation of the preheat control voltage (VP) in accordance with equation (1). Steps 126 and 127 determine whether the set speed signal is present. During this portion of the START subroutine, no set speed signal should be present, therefore, control of the program is returned to step 128 of FIG. 6.

Referring again to FIG. 6, steps 128 and 129 determine whether set speed signal is present. If the set speed signal is not present, steps 118 through 129 are repeated. However, if set speed signal is present in step 129, step 130 delays execution of the program for a predetermined time. Step 131 initializes the in-specification timer. Steps 132 and 133 also determine whether the set speed signal is present. If the set speed signal is not present, seps 117 through 133 are repeated. However, if the set speed signal is present, step 134 calls a subroutine which determines the preheat and quench-point control voltages ($VP_s$) and (VQ), respectively.

Figure 8:
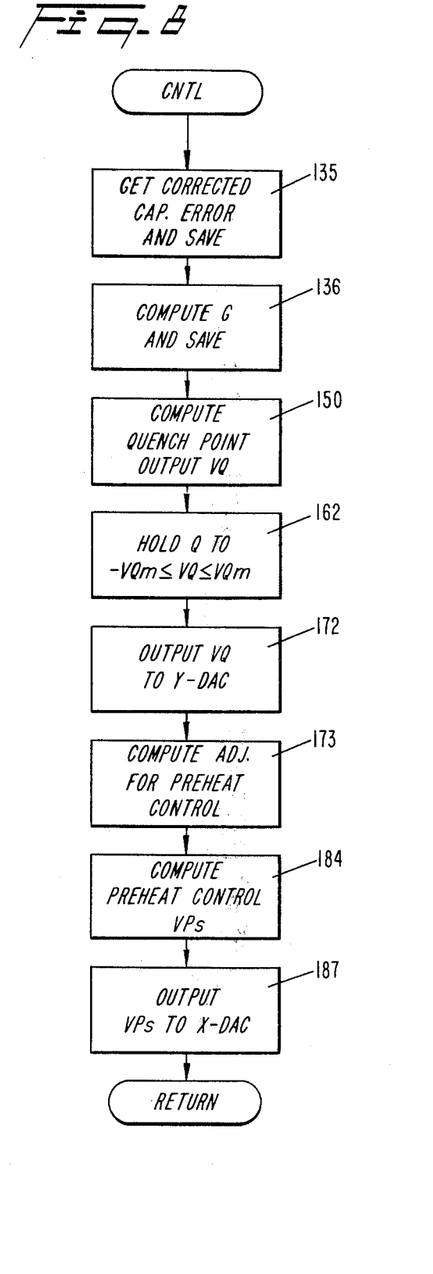

Referring to FIG. 8, the flow chart therein reveals the steps of a CNTL subroutine which determines the preheat and quench point control voltages ($VP_s$) and (VQ), respectively. Step 135 samples channel 1 of the analog system 60 which is coupled to the capacitance monitor 50 and fetches the capacitance monitor error signal. Step 136 calls a subroutine which calculates an instantaneous displacement value (G).

Figure 9:
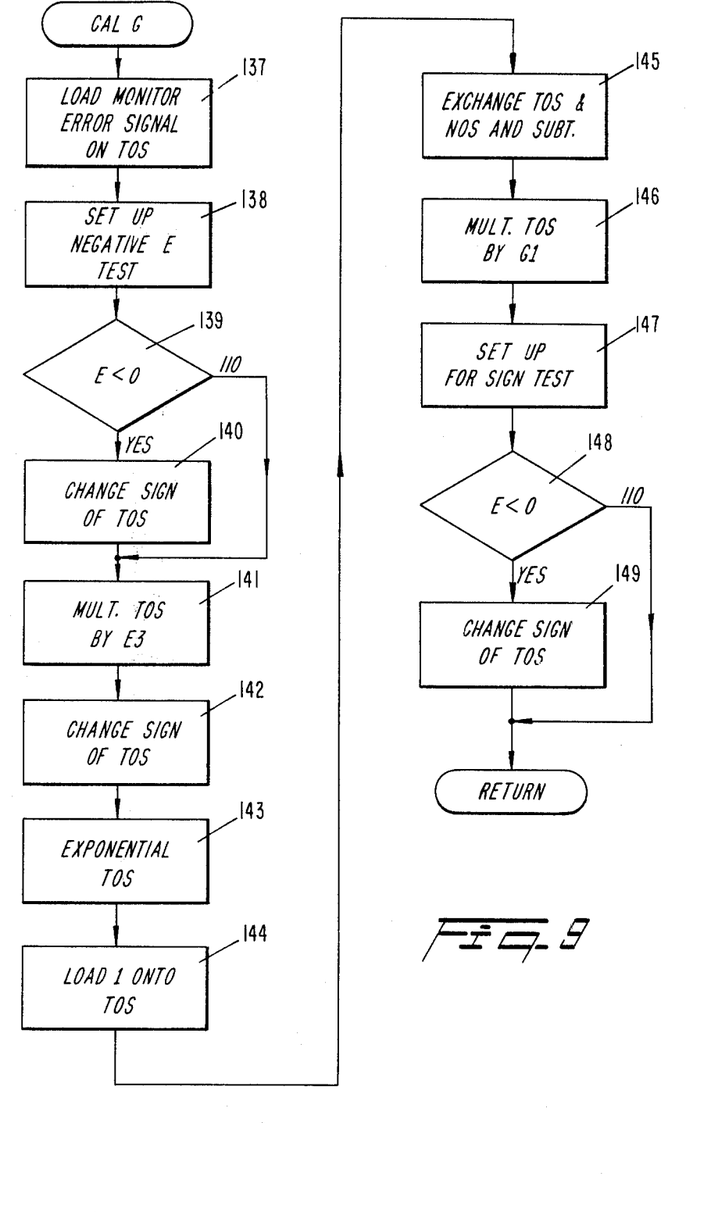

Referring to FIG. 9, the flow chart therein reveals the steps of a CALG subroutine which calculates the instantaneous displacement value (G) which is defined by the equation (3) above. Step 137 facilitates the loading of the capacitance monitor error signal (E) on the TOS. Steps 138 and 139 determine whether the sign of the error signal (E) is negative. If the sign of the error signal (E) is negative, step 140 changes the sign to a positive sign. Step 141 multiplies an absolute value of the error signal (E) by an empirical constant E3 and stores the product on TOS. Step 142 changes the sign of the result stored on the TOS. Step 143 facilitates the application of the exponential function to the product stored on TOS and stores the result on TOS. Step 144 loads a value of one (1) on the TOS and the result obtained in step 143 is stored in the NOS position. Step 145 facilitates the subtraction of the value stored in the NOS position from the value stored in the TOS position and stores the result on the TOS. Step 146 facilitates the multiplication of the result stored on the TOS by the constant G1. Step 147 and 148 determine the sign of the error signal (E). If the sign of the error signal (E) is negative, step 149 changes the sign of the result stored on the TOS which now represents the instantaneous displacement value (G). Thereafter, control of the program is returned to step 150 of FIG. 8.

Figure 10:
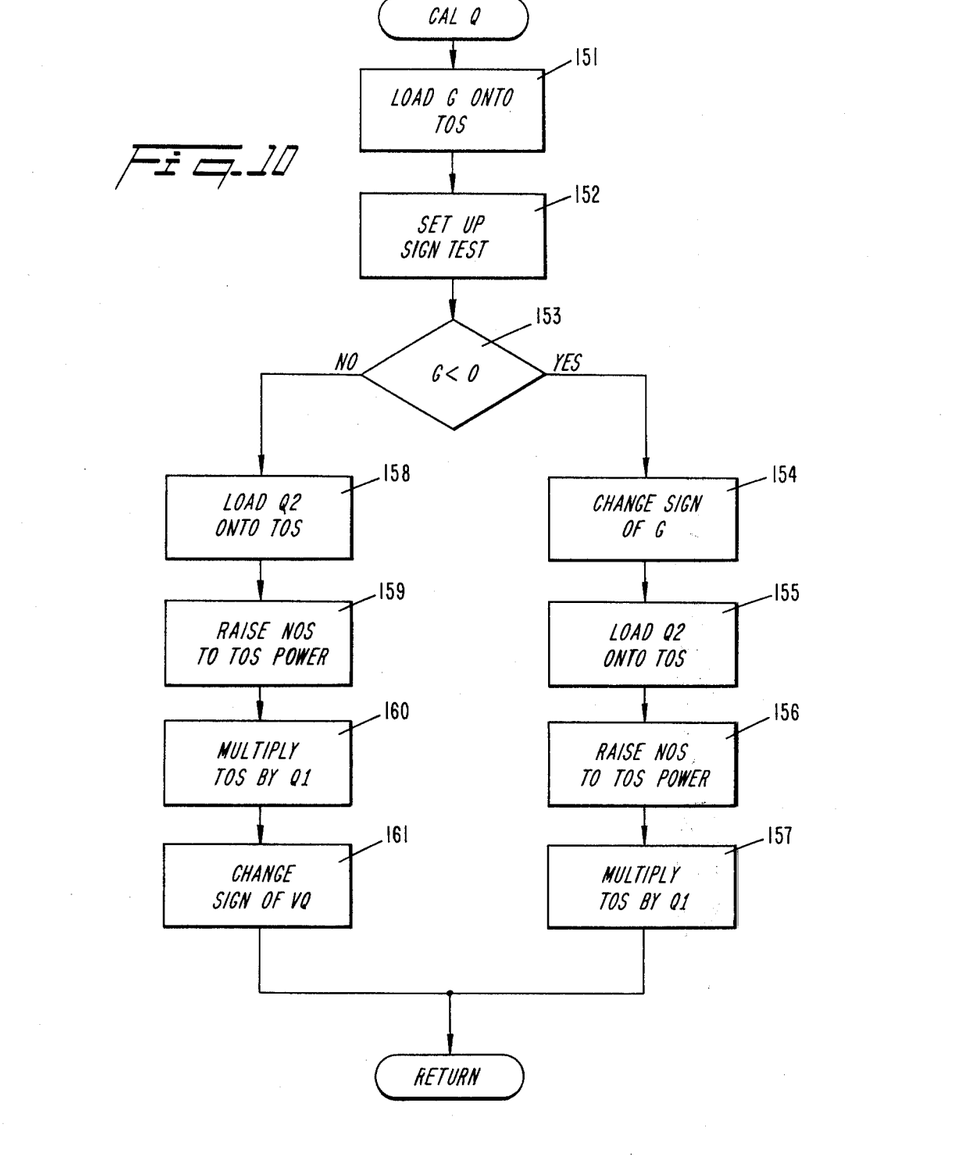

Step 150 of FIG. 8 calls a CALO subroutine which computes the quench-point control voltage (VQ). As noted above the quench-point control (VQ) is represented by equation (4) above. Referring to FIG. 10, the flow chart illustrated therein reveals the steps of the CALO subroutine. Step 151 loads the value of G onto the TOS. Steps 152 and 153 determine the sign of G. If the sign of G is negative, step 154 changes the sign. Step 155 loads the empirical constant Q2 onto the TOS. Step 156 facilitates the generation of a factor wherein the value of G is raised to a power of Q2. Step 157 multiplies the factor generated in step 156 by the constant Q1 thus producing the quench-point control voltage (VQ). If the sign of G is positive in step 153, steps 158 through 160 produce the control voltage (VQ) in the same fashion as steps 155 through 157. Step 161 facilitates the generation of a negative sign for the control voltage (VQ). Thereafter control is returned to step 162 of FIG. 8.

Figure 11:
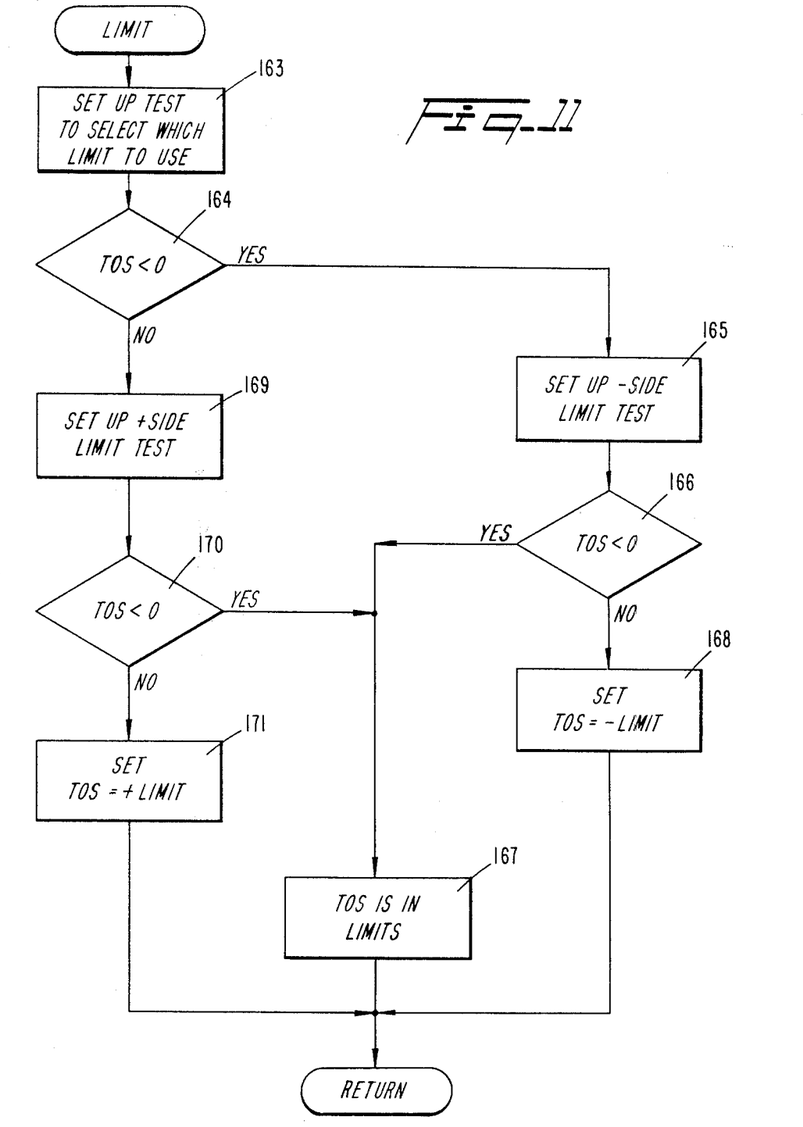

Step 162 of FIG. 8 calls a LIMIT subroutine which compares a value stored on the TOS with a limiting value. Referring to FIG. 11, the flow chart therein reveals the steps of the LIMIT subroutine. The limiting value is a positive value and is also referred to as an upper limit. A lower limit is a negative equivalent value of the upper limit. Steps 163 and 164 determine the sign of the value stored on the TOS. If the sign of the value is negative, step 165 (1) copies the values stored on the TOS into the NOS position, (2) recalls the lower limit value from memory and places it on the TOS, (3) changes the limit value's sign and (4) subtracts the value stored on the TOS from the value stored in the NOS position and stores the result on the TOS. Step 166 determines the sign of the value stored on the TOS. If the sign of the value stored on the TOS is negative, the value stored on the TOS is within the predetermined limit and step 167 restores the value to the TOS. However, if the sign of the value stored on the TOS in step 166 is positive, step 168 replaces the value stored on the TOS with the lower limit value.

If the sign of the value stored on the TOS in step 164 is positive, step 169 (1) copies the value stored on the TOS into the NOS position, (2) recalls the upper value from memory and (3) subtracts the value stored on the TOS from the value stored in the NOS position and stores the result on the TOS. Step 170 determines the sign of the value stored on the TOS. If the sign of the value in step 170 is negative, the value stored on the TOS is within limits and step 167 restores that value to the TOS. However, if the sign of the value in step 170 is positive, step 171 replaces the value stored on the TOS with the upper limit value. Thereafter, control of the program is returned to step 172 of FIG. 8.

Referring again to FIG. 8, step 172 facilitates the feeding of control voltage (VQ) to the servo amplifier 44 through the analog system 60. Step 173 calls a subroutine which calculates a cumulative displacement value (V1).

Figure 12:
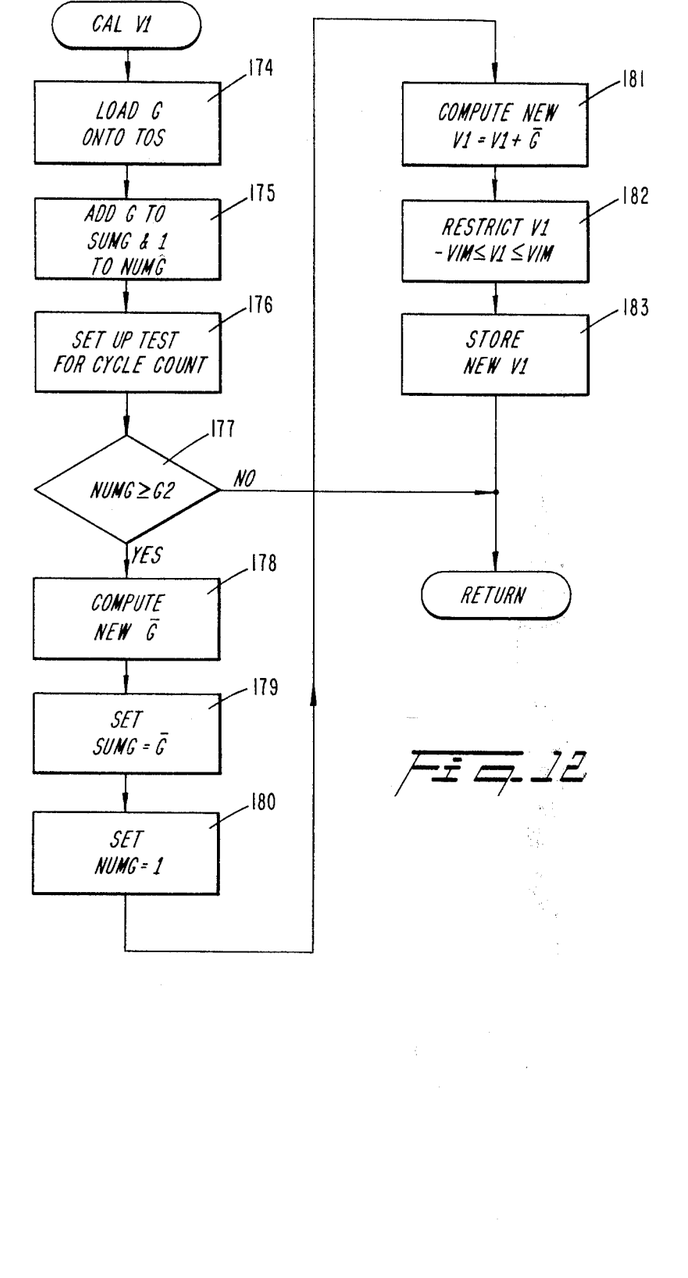

Referring to FIG. 12, the flow chart illustrated therein reveals the steps of a CALV1 subroutine which calculates the cumulative displacement value (V1) which is defined by the equation:

$$V1 = V1 + GAVG \qquad (5)$$

where
GAVG = average value of the instantaneous displacement value (G) over G2 program cycles, and
G2 = an empirical constant.

The cumulative displacement value (V1) is stored in a particular memory location within the microcomputer 54. Periodically, the value (V1) is updated and the new or later-derived value (V1) replaces the previously stored value in the particular memory location. It is to be understood that, in equation (5), the cumulative displacement value (V1) is added to the average value (GAVG) of the instantaneous displacement value (G) to produce the new or later-derived cumulative displacement value (V1) and the result is stored in the particular memory location associated with the variable (V1). Step 174 facilitates loading the value of G onto the TOS. Step 175 adds (1) the value of G to a RAM variable SUMG, (2) a value of one to a RAM variable NUMG and (3) stores each of the results in memory. Steps 176 and 177 determine whether the value of NUMG is greater than or equal to the empirical constant G2. If the value of NUMG is greater than or equal to the value of G2, step 178 computes a new average value of G and sets the RAM variable GAVG equal to the result. Steps 179 and 180 facilitate setting SUMG equal to GAVG and NUMG equal to a value of one, respectively. Step 181 computes the new value for the cumulative displacement value V1 according to equation (5) and stores the result on the TOS. Step 182 calls the LIMIT subroutine which compares the value stored on the TOS with a limiting value according to steps 163 through 168 as noted above. Step 183 stores the value (V1) in memory. Thereafter, control of the program is returned to step 184 of FIG. 8.

Step 184 of FIG. 8 calls the CALV subroutine which computes the value for the preheat control voltage (VP). Referring to FIG. 7, steps 123 through 127 compute the control voltage (VP) as a function of line speed (S) as noted above. However, if set speed signal is present in step 127, the control voltage (VP$_s$) is adjusted and becomes a function of line speed (S) and the capacitance monitor error signal (E). The preheat voltage (VP$_s$) is then defined by equation (2) above. Step 185 facilitates adding the value (V1) to the voltage (VP) computed in step 126 which is presently a function of only the line speed (S). Step 126 facilitates the adding of G to the result computed in step 185 which generates control voltage (VP$_s$). Thereafter, control is returned to step 187 of FIG. 8.

Step 187 of FIG. 8 facilitates the application of control voltage (VP$_s$) through the analog system 60 to the preheat power supply 34. Thereafter, control of the program is transferred to step 188 of FIG. 6. Referring to FIG. 6, steps 188 and 189 determine the sign of the capacitance monitor error signal (E). If the sign of the error signal (E) is determined to be negative, step 190 changes the sign to positive. If the sign of the error signal (E) is determined to be positive in step 189, control of the program is transferred to step 191. Steps 191 and 192 determine whether the capacitance monitor error signal (E) has attained a desired value which indicates that the conductor 20 meets desired specifications. If the desired value was not attained in step 192, steps 131 through 192 are repeated. If the desired value of error signal (E) was attained, steps 193 and 194 determine whether a count of the in-specification timer, initialized in step 131, has attained a desired count value. If the desired count value has not been attained in step 194, steps 132 through 194 are repeated. However, if the desired count value has been attained in step 194, step 195 facilitates (1) the generation of the cut-over signal, (2) the feeding of the cut-over signal to the take-up system through the UPI and (3) ending the cut-over signal on receipt of the acknowledgement signal from the take-up system. Step 196 re-initializes all of the RAM variables. Thereafter, the control of the program is transferred to step 197 of FIG. 4.

Referring to FIG. 4, step 197 calls the CNTL subroutine which, as noted above, (1) generates the preheat and quench-point control voltages (VP$_s$) and (VQ), respectively, and (2) facilitates the application of the preheat and quench-point control voltages to the preheat power supply 34 and the servo amplifier 44, respectively. The system 30 is now in the steady-state condition and steps 109 through 197 may be repeated to maintain the steady-state condition.

While the principles of this invention are applicable to a dual layer insulated conductor 20 with the solid plastic layer 26 extruded over the cellular plastic layer 24 of insulation, the principles are equally applicable to a single layer 24 of cellular plastic insulation as shown in FIG. 3. Further, the principles are also applicable to dual layer insulated conductors with the cellular plastic layer extruded over an inner solid plastic layer. However, it is desirable to have the solid plastic layer as the outer layer 26.

In summary, the capacitance monitor 50 continuously measures the coaxial capacitance of the insulated conductor 20. As a result of the continuous measurement of capacitance, the error signal (E) is produced which facilitates the adjustment of the preheat control voltage (VP$_s$) and the quench-point control voltage (VQ). This adjustment of the control voltages (VP$_s$) and (VQ) improves the control of the expansion of the insulated conductor 20 and facilitates the manufacture of insulated conductor having desired characteristics.

What is claimed is:

1. A method of controlling the expansion of cellular insulation in the manufacture of an insulated conductor having a conductive element and a layer of cellular insulation extruded thereabout, which comprises the steps of:

preheating a bare conductive element to an initial temperature;

advancing the preheated conductive element through an extruder whereat a layer of cellular insulation is extruded thereabout to form an insulated conductor;

quenching the insulated conductor at a point to stop the expansion of the layer of cellular insulation;

measuring the coaxial capacitance of the insulated conductor subsequent to the step of quenching;

generating an error signal which is the difference between the measured capacitance and a standard capacitance value; and adjusting the temperature of the conductive element as a function of line speed and the error signal and adjusting the point of quenching the insulated conductor as a function of the error signal whereby the adjusting of the temperature and the point of quenching controls the expansion of the layer of cellular insulation.

2. The method as set forth in claim 1 wherein the line speed is greater than a predetermined minimum speed and wherein the step of preheating comprises the steps of:

generating a preheat control voltage as a function of line speed;

applying the preheat control voltage to a preheat power supply to generate a preheat voltage; and applying the preheat voltage across a selected length of the bare conductive element to heat the element to the initial temperature.

3. The method as set forth in claim 1 which further comprises the step of:

generating a set speed signal which represents that an operating line speed for advancing the conductive element through the extruder has been attained;

and wherein the step of adjusting the temperature of the conductive element comprises the steps of:

generating, in response to the set speed signal, a preheat control voltage as a function of line speed and the error signal;

applying the preheat control voltage to a preheat power supply to generate a preheat voltage in relation to the line speed and the error signal; and applying the preheat voltage to a selected length of the bare conductive element previously preheated to the initial temperature to adjust the temperature of the conductive element.

4. The method as set forth in claim 1 wherein the step of quenching the insulated conductor comprises the step of moving the insulated conductor into a cooling bath.

5. The method as set forth in claim 4 which further comprises the step of:

generating a set speed signal which represents that an operating line speed for advancing the conductive element through the extruder has been attained; and wherein the cooling bath is movable relative to the extruder and wherein the step of adjusting the point of quenching comprises the steps of:

generating, in response to the set speed signal, a quench-point control voltage as a function of the error signal; and applying the quench-point control voltage to a servo amplifier which facilitates movement of the cooling bath relative to the extruder to adjust the point of quenching the insulated conductor.

6. The method as set forth in claim 1 which further comprises the step of advancing the insulated conductor through an air gap, prior to the step of quenching, whereat the layer of cellular insulation expands about the conductive element.

7. The method as set forth in claim 1 which further comprises the steps of:

advancing initially the insulated conductor onto a first take-up reel during a period when the error signal indicates that the insulated conductor fails to meet desired specifications;

generating a cut-over signal when the generated error signal attains a desired value which indicates that the insulated conductor meets desired specifications;

transferring, in response to the cut-over signal, the insulated conductor onto a second take-up reel; and advancing, thereafter, the insulated conductor onto the second take-up reel.

8. A method of controlling the expansion of cellular insulation in the manufacture of an insulated conductor having a conductive element and a layer of cellular insulation extruded thereabout, which comprises the steps of:

generating a first preheat control voltage as a function of line speed wherein the line speed is greater than a predetermined minimum speed;

applying the first preheat control voltage to a preheat power supply to generate a preheat voltage;

applying the preheat voltage across a selected length of the bare conductive element to heat the element to the initial temperature;

advancing the preheated conductive element through an extruder whereat a layer of cellular insulation is extruded thereabout to form an insulated conductor;

advancing the insulated conductor through an air gap whereat the layer of cellular insulation expands about the conductive element;

moving the insulated conductor into a cooling bath which is movable relative to the extruder at a quench-point to stop the expansion of the layer of cellular insulation;

measuring the coaxial capacitance of the insulated conductor subsequent to the step of moving;

generating an error signal which is the difference between the measured capacitance and a standard capacitance value;

generating a set speed signal which represents that an operating line speed for advancing the conductive element through the extruder has been attained;

generating, in response to the set speed signal, a second preheat control voltage as a function of line speed and the error signal;

applying the second preheat control voltage to the preheat power supply to generate a preheat voltage in relation to the line speed and the error signal;

applying the preheat voltage to the selected length of the bare conductive element previously preheated to the initial temperature to alter the temperature of the conductive element;

generating, in response to the set speed signal, a quench-point control voltage as function of the error signal; and applying the quench-point control voltage to a servo amplifier which facilitates movement of the cooling bath relative to the extruder to adjust the quench-point of the insulated conductor.

9. The method as set forth in claim 8 which further comprises the steps of:

advancing initially the insulated conductor onto a first take-up reel during a period when the error signal indicates that the insulated conductor fails to meet desired specifications;

generating a cut-over signal when the generated error signal attains a desired value which indicates that the insulated conductor meets desired specifications;

transferring, in response to the cut-over signal, the insulated conductor onto a second take-up reel; and advancing, thereafter, the insulated conductor onto the second take-up reel.

10. A system for controlling the expansion of cellular insulation in the manufacture of an insulated conductor having a conductive element and a layer of cellular plastic insulation extruded thereabout, which comprises:

an extruder;

means for preheating a bare conductive element to an initial temperature;

means for advancing the preheated conductive element through the extruder whereat a layer of cellular insulation is extruded thereabout to form an insulated conductor;

means for quenching the insulated conductor at a point to stop the expansion of the layer of cellular insulation;

means for measuring the coaxial capacitance of the insulated conductor subsequent to being quenched by the quenching means;

means for generating an error signal which is the difference between the capacitance measured by the measuring means and a standard capacitance value; and means for adjusting the temperature of the conductive element as a function of line speed and the error signal and adjusting the point of quenching the insulated conductor as a function of the error signal whereby the adjusting of the temperature and the point of quenching controls the expansion of the layer of cellular insulation.

11. The system as set forth in claim 10, wherein the line speed is greater than a predetermined minimum line speed and wherein the means for preheating comprises:

a preheat power supply;

means for generating a preheat control voltage as a function of line speed;

means for applying the generated preheat control voltage to the preheat power supply to generate a preheat voltage; and means for applying the preheat voltage across a selected length of the bare conductive element to heat the element to the initial temperature.

12. The system as set forth in claim 10 which further comprises:

means for generating a set speed signal which represents that an operating line speed for advancing the conductive element through the extruder has been attained;

and wherein the means for adjusting the temperature comprises:

a preheat power supply;

means for generating, in response to the set speed signal, a preheat control voltage as a function of the line speed and the generated error signal;

means for applying the preheat control voltage to the preheat power supply to generate a preheat voltage in relations to the line speed and the error signal; and means for applying the preheat voltage to a selected length of the bare conductive element previously preheated to the initial temperature to adjust the temperature of the conductive element.

13. The system as set forth in claim 10 wherein the means for quenching comprises:

a cooling bath mounted for movement relative to the extruder; and means for moving the insulated conductor into the cooling bath.

14. The system as set forth in claim 13 which further comprises:

means for generating a set speed signal which represents that an operating line speed for advancing the conductive element through the extruder has been attained;

means for moving the cooling bath relative to the extruder;

and wherein the means for adjusting the point of quenching comprises:

means for generating, in response to the set speed signal, a quench-point control voltage as a function of the error signal; and means for applying the quench-point control voltage to the means for moving the cooling bath relative to the extruder to adjust the point of quenching the insulated conductor.

15. The system as set forth in claim 10 which further comprises means for advancing the insulated conductor through an air gap between the extruder and the quenching means, whereat the layer of cellular insulation expands about the conductive element.

16. The system as set forth in claim 10 which further comprises:

a first take-up reel;

a second take-up reel;

means for advancing initially the insulated conductor onto the first take-up reel during a period when the error signal indicates that the insulated conductor fails to meet desired specifications;

means for generating a cut-over signal when the generated error signal attains a desired value which indicates that the insulated conductor meets desired specifications;

means for transferring in response to the cut-over signal, the insulated conductor onto the second take-up reel; and means for advancing, thereafter, the insulated conductor onto the second take-up reel.

17. A system for controlling the expansion of cellular insulation in the manufacture of an insulated conductor having a conductive element and a layer of cellular plastic insulation extruded thereabout, which comprises:

a preheat power supply;

a cooling bath;

means for generating a first preheat control voltage as a function of line speed wherein the line speed is greater than a predetermined minimum speed;

means for applying the generated first preheat control voltage to the preheat power supply to generate a preheat voltage;

means for applying the preheat voltage across a selected length of the bare conductive element to heat the element to the initial temperature;

an extruder;

means for advancing the preheated conductive element through the extruder whereat a layer of cellular insulation is extruded thereabout to form an insulated conductor;

means for advancing the insulated conductor through an air gap whereat the layer of cellular insulation expands about the conductive element;

a cooling bath mounted for movement relative to the extruder;

means for moving the cooling bath relative to the extruder;

means for moving the insulated conductor into the cooling bath at a quench-point to stop the expansion of the layer of cellular insulation;

means for measuring the coaxial capacitance of the insulated conductor subsequent to the step of moving;

means for generating an error signal which is the difference between the measured capacitance and a standard capacitance value;

means for generating a set speed signal which represents that an operating line speed for advancing the conductive element through the extruder has been attained;

means for generating, in response to the set speed signal, a second preheat control voltage as a function of line speed and the error signal;

means for applying the second preheat control voltage to the preheat power supply to generate a preheat voltage in relation to the line speed and the error signal;

means for applying the preheat voltage to the selected length of the bare conductive element previously preheated to the initial temperature to alter the temperature of the conductive element;

means for generating, in response to the set speed signal, a quench-point control voltage as function of the error signal; and means for applying the quench-point control voltage to the means for moving the cooling bath relative to the extruder to adjust the quench-point of the insulated conductor.

18. The system as set forth in claim 17 which further comprises:

a first take-up reel;

a second take-up reel;

means for advancing initially the insulated conductor onto the first take-up reel during a period when the error signal indicates that the insulated conductor fails to meet desired specifications;

means for generating a cut-over signal when the generated error signal attains a desired value which indicates that the insulated conductor meets desired specifications;

means for transferring, in response to the cut-over signal, the insulated conductor onto the second take-up reel; and means for advancing, thereafter, the insulated conductor onto the second take-up reel.

* * * * *